US005777000A

United States Patent [19]

Sakagami et al.

[11] Patent Number: 5,777,000
[45] Date of Patent: Jul. 7, 1998

[54] PLASTIC LENS AND PRODUCTION PROCESS THEREOF

[75] Inventors: Teruo Sakagami; Akira Saito, both of Iwaki, Japan

[73] Assignee: Kureha Kagaku Kogyo Kabushiki Kaisha, Tokyo, Japan

[21] Appl. No.: 727,608

[22] PCT Filed: Mar. 15, 1995

[86] PCT No.: PCT/JP95/00421

§ 371 Date: Oct. 16, 1996

§ 102(e) Date: Oct. 16, 1996

[87] PCT Pub. No.: WO95/30161

PCT Pub. Date: Nov. 9, 1995

[30] Foreign Application Priority Data

Apr. 28, 1994 [JP] Japan ................... 6-111692

[51] Int. Cl.$^6$ ................... C08F 20/20
[52] U.S. Cl. ................... 523/106; 526/322; 526/323.1
[58] Field of Search ................... 523/106; 526/322, 526/323.1, 323.2

[56] References Cited

U.S. PATENT DOCUMENTS

| 4,513,349 | 4/1985 | Olson | 526/323.1 |
| 4,515,931 | 5/1985 | Olson | 526/323.2 |

FOREIGN PATENT DOCUMENTS 51-132296 11/1976 Japan.
6-322087 11/1994 Japan.

*Primary Examiner*—Paul R. Michl
*Attorney, Agent, or Firm*—Frishauf, Holtz, Goodman, Langer & Chick, P.C.

[57] ABSTRACT

Disclosed is a plastic lens formed of a crosslinked polymer obtained by polymerizing or copolymerizing a monomer composition comprising as essential component the following component (A) and/or the following component (B), and optionally a component (C) composed of at least one monomer copolymerizable with the essential component comprising the component (A) and/or the component (B):

Component (A):

an ester obtained from (1)(a) a diol which is obtained by reducing a dimer of an unsaturated fatty acid having 16–18 carbon atoms and/or (b) a diol which is obtained by reducing a dimer of a lower alcohol ester of an unsaturated fatty acid having 16–18 carbon atoms, and (2) acrylic acid or methacrylic acid; and Component (B):

an ester obtained from (1)(a) a triol which is obtained by reducing a trimer of an unsaturated fatty acid having 16–18 carbon atoms and/or (b) a triol which is obtained by reducing a trimer of a lower alcohol ester of an unsaturated fatty acid having 16–18 carbon atoms, and (2) acrylic acid or methacrylic acid.

The plastic lens is high in density of crosslinking and low in specific gravity and has good optical properties.

12 Claims, No Drawings 5,777,000

PLASTIC LENS AND PRODUCTION PROCESS THEREOF

TECHNICAL FIELD

The present invention relates to a plastic lens made of a synthetic resin and a production process thereof, and more particularly to a lightweight plastic lens formed of a crosslinked polymer and a production process thereof.

BACKGROUND ART

A variety of inorganic glass lenses have heretofore been used as optical lenses. In recent years, plastic lenses have begun being used widely other than the inorganic glass lenses owing to their good lightweight property, processability, safety, dyeability, high-volume production capability and reducibility in cost.

Among various required properties of materials for optical lenses, it is extremely important for them to have a low specific gravity. More specifically, if an optical lens formed of a material low in specific gravity is realized, the use of such a lens permits reduction in the weight of a lens system, which occupies a significant part in optical instruments, for example, microscopes, cameras, telescopes, etc., and spectacle lenses.

Even in the research and development of materials for plastic lenses, therefore, there is a tendency to attempt making their specific gravity still lower so as to stress predominance over materials for inorganic glass lenses.

For example, there has been known a diethylene glycol bisallyl carbonate resin designated "CR-39" as a plastic material for spectacle lenses, which has spread widest at present. However, the specific gravity of this resin is as comparatively high as 1.31 (as measured at 20° C.; the same shall apply to the following).

Besides, materials for plastic lenses, which contain halogen or sulfur atoms, have recently been known as materials for high-refractive index lenses. Such a material for plastic lenses however has a specific gravity as comparatively high as 1.3–1.4 or so.

Further, thermoplastic resins such as polystyrene (specific gravity: 1.02), polymethyl methacrylate (specific gravity: 1.20) and polycarbonate (specific gravity: 1.19) have been known as materials for plastic lenses having comparatively low specific gravities. However, the polystyrene resin is low in hardness and lacking in solvent resistance, the polymethyl methacrylate resin is low in refractive index, and the polycarbonate resin is also low in hardness and lacking in impact resistance. Therefore, such materials cannot be said to have sufficient performance in use.

On the other hand, copolymers having crosslinked structure have been introduced as plastic lens materials excellent in various performance characteristics such as heat resistance, solvent resistance and mechanical strength. For example, a plastic lens material, "NIKON LIGHT DELUXE II" (trade name), which has triazine ring structure, or the like has been put to practical use. This plastic lens material has a specific gravity as comparatively low as 1.17. However, such a specific gravity is not said to be sufficient for more reducing the weight of plastic lenses.

In the conventional materials for plastic lenses, particularly, the copolymers having crosslinked structure, as described above, it is not said that the reduction in specific gravity has been fully achieved. There has thus been a strong demand for development of an optical material combining a high density of crosslinking with an extremely low specific gravity.

DISCLOSURE OF INVENTION

The present invention has been completed in view of the foregoing circumstances and has as its object the provision of a plastic lens formed of a crosslinked polymer being high in density of crosslinking and having excellent physical properties that the specific gravity is low, and moreover possessing good optical properties, as well as a production process thereof.

The plastic lens according to the present invention is characterized in that it is formed of a crosslinked polymer obtained by polymerizing or copolymerizing a monomer composition comprising as essential component the following component (A) and/or the following component (B), and optionally a component (C) composed of at least one monomer copolymerizable with the essential component comprising the component (A) and/or the component (B):

Component (A):
  an ester obtained from (1)(a) a diol which is obtained by reducing a dimer of an unsaturated fatty acid having 16–18 carbon atoms and/or (b) a diol which is obtained by reducing a dimer of a lower alcohol ester of an unsaturated fatty acid having 16–18 carbon atoms, and (2) acrylic acid or methacrylic acid; and Component (B):
  an ester obtained from (1)(a) a triol which is obtained by reducing a trimer of an unsaturated fatty acid having 16–18 carbon atoms and/or (b) a triol which is obtained by reducing a trimer of a lower alcohol ester of an unsaturated fatty acid having 16–18 carbon atoms, and (2) acrylic acid or methacrylic acid.

In the present invention, the monomer composition may preferably contain the component (A) and the component (B) in a mass ratio of from 97:3 to 30:70.

In the present invention, the component (C) may preferably be composed of at least one monomer having at least one acrylic, methacrylic or vinyl group, and the monomer composition may preferably contain the component (C) in a mass ratio equal to or lower than the total amount of the component (A) and the component (B). The component (C) may more preferably be composed of an aromatic vinyl compound.

The process for producing a plastic lens according to the present invention is characterized in that it comprises the step of polymerizing or copolymerizing a monomer composition comprising the above-described component (A) and/or the above-described component (B), and optionally a component (C) composed of at least one monomer copolymerizable with the essential component comprising the component (A) and/or the component (B).

In the plastic lens according to the present invention, the crosslinked polymer, from which the lens is formed, has a specific gravity as extremely low as 1.15 or lower and a highly crosslinked structure, and it has high transparency and suitable optical properties required of optical lenses. In addition, the polymer is also excellent in physical properties such as solvent resistance, heat resistance and surface hardness and hence has extremely good performance well balanced among the above-mentioned properties.

The plastic lens according to the present invention is formed of a crosslinked polymer obtained by polymerizing or copolymerizing a monomer composition containing either or both of:

(1) a component (A) which is an ester obtained from a component (A-1) composed of a specific diol, and acrylic acid or methacrylic acid (hereinafter referred to as "(meth)acrylic acid"); and (2) a component (B) which is an ester obtained from a component (B-1) composed of a specific triol, and (meth) acrylic acid.

The specific diol of the component (A-1) is a diol obtained by subjecting a component (A-2) composed of:

(i) a dimer (hereinafter may referred to as "dimer acid") of an unsaturated fatty acid having 16–18 carbon atoms, or (ii) a dimer (hereinafter may referred to as "dimer acid ester") of a lower alcohol ester of an unsaturated fatty acid having 16–18 carbon atoms to reduction by hydrogenation.

The specific triol of the component (B-1) is a triol obtained by subjecting a component (B-2) composed of:

(iii) a trimer (hereinafter may referred to as "trimer acid") of an unsaturated fatty acid having 16–18 carbon atoms, or (iv) a trimer (hereinafter may referred to as "trimer acid ester") of a lower alcohol ester of an unsaturated fatty acid having 16–18 carbon atoms to reduction by hydrogenation.

As the higher unsaturated fatty acids which are raw materials for the component (A-2) and the component (B-2), there may be used those having 1–4 unsaturated bonds (double bonds), preferably 1–2 unsaturated bonds and 16–18 carbon atoms in total per molecule.

Specific examples of such higher unsaturated fatty acids include oleic acid, elaidic acid, octadecenoic acid, linoleic acid, linolenic acid, isooleic acid and branched chain octadecenoic acid. These higher unsaturated fatty acids may be used either singly or in any combination thereof.

As the lower alcohol ester of the higher unsaturated fatty acid, there may be used an ester of the above-mentioned higher unsaturated fatty acid with a lower aliphatic alcohol having 1–6 carbon atoms, preferably 1–4 carbon atoms. Examples thereof include methyl esters, ethyl esters, propyl esters and butyl esters. These esters of the higher unsaturated fatty acids may be used either singly or in any combination thereof.

A raw material composed of such a higher unsaturated fatty acid or higher unsaturated fatty acid ester is reacted to obtain the component (A-2) as a dimer thereof or the component (B-2) as a trimer thereof.

As a catalyst for the reaction, there may be used a liquid or solid Lewis acid or Brönsted acid. Specific examples thereof include various activated clays such as montmorillonite type activated clay and bentonite type activated clay, synthetic zeolites, silica/alumina, and silica/magnesia. The use of the montmorillonite type activated clay is particularly preferred.

The amount of such a reaction catalyst to be added is 1–20 mass%, preferably 2–8 mass% based on the raw material.

With respect to other reaction conditions, the reaction temperature is 200°–270° C., preferably 230°–250° C., while the reaction pressure is usually a pressure somewhat higher than ordinary pressure, but may also be ordinary pressure, and specifically is 1–10 atm. The reaction time is usually 5–7 hours though it may vary according to the amount of the catalyst and the reaction temperature. In this reaction, the viscosity of the reaction system increases as the reaction progresses.

After completion of the reaction, the catalyst is removed by filtration from the liquid reaction mixture, and the liquid reaction mixture is then subjected to, for example, vacuum distillation, thereby distilling out unreacted raw materials and branched chain fatty acids produced. Thereafter, the component (A-2) of the dimer can be distilled out. The distillation can be further continued to distill out the component (B-2) of the trimer.

When the higher unsaturated fatty acid is used as the raw material in the reaction mentioned above, a dimer acid having 2 carboxyl groups and a trimer acid having 3 carboxyl groups are provided as the component (A-2) and the component (B-2), respectively. On the other hand, when the higher unsaturated fatty acid ester is used as the raw material, a dimer acid ester having 2 ester bonds and a trimer acid ester having 3 ester bonds are provided as the component (A-2) and the component (B-2), respectively.

Such a component (A-2) or component (B-2) is subjected to reduction by hydrogenation, thereby obtaining the component (A-1) composed of a diol or the component (B-1) composed of a triol.

As a process for subjecting the component (A-2) or (B-2) to the reduction by hydrogenation, there may be employed any known chemical reduction process, for example, a reduction process making use of a hydrogenating agent such as lithium aluminum hydride ($LiAlH_4$).

More specifically, lithium aluminum hydride is dispersed in an ether solvent such as diethyl ether in such a manner that the molar ratio of the lithium aluminum hydride is 2 times to the component (A-2) of the dimer or 3 times to the component (B-2) of the trimer. The component (A-2) or (B-2) diluted with diethyl ether is gradually added dropwise to this dispersion over 1–2 hours at temperature of from 0° C. to room temperature, thereby conducting a reaction. After completion of the drop addition of the component (A-2) or (B-2), the resulting mixture is stirred for about 30 minutes, and meantime water is gradually added dropwise in an amount about 4 times, in terms of molar ratio, of the lithium aluminum hydride added, thereby completing the reaction. Dilute sulfuric acid is added to the liquid reaction mixture in an amount of about 10 mass% based on the reaction mixture, and lithium and aluminum are removed from an ether layer or phase. The ether layer is then washed with water until waste liquid becomes neutral. The ether in the ether layer is then removed, thereby obtaining the component (A-1) or the component (B-1).

Each of the components (A-1) and (B-1) is a liquid at room temperature, which is transparent, somewhat yellowish and viscous.

As a process for subjecting the component (A-2) or (B-2) to the reduction by hydrogenation, there may also be employed a catalytic reduction process with hydrogen gas.

When the hydrogenation is conducted by the catalytic reduction process, Raney nickel, platinum carried on nickel diatomaceous earth, copper-chromium or the like is used as a catalyst. This catalyst is added in a proportion of 0.1–7 mass% to the component (A-2) or (B-2). With respect to other reaction conditions, the reaction temperature is 50°–300° C., preferably 150°–280° C., the pressure of the hydrogen gas is ordinary pressure to 300 kg/cm$^2$, preferably 100–250 kg/cm$^2$, and the reaction time is 1–15 hours, preferably 4–8 hours.

In the above reaction, the component (A-1) and the component (B-1) may be separately obtained by individually hydrogenating the component (A-2) and the component (B-2), while the component (A-1) and the component (B-1) may also be obtained in the form of a mixture thereof by preparing a mixture of the component (A-2) and the component (B-2) and hydrogenating this mixture.

The component (A-1) or (B-1) obtained in this manner can be esterified with (meth)acrylic acid, thereby obtaining the component (A) or (B) which is a monomer as a direct raw material in the present invention.

This esterification may be conducted, for example, by reacting the component (A-1) or (B-1) with (meth)acrylic acid in an amount 1.0–2.0 times, preferably 1.0–1.5 times, in terms of molar ratio, of the total amount of the hydroxyl groups in this component in the presence of necessary additives such as a catalyst and a polymerization inhibitor.

As the catalyst, there may be used hydrogen fluoride, hydrogen trifluoride, p-toluenesulfonic acid, methanesulfonic acid, sulfuric acid or the like. The proportion of the catalyst to be added is 1–10 mass%, preferably 2–5 mass% based on the total amount of the component (A-1) or (B-1) and (meth)acrylic acid.

As the polymerization inhibitor to be used for inhibiting a side reaction in this esterification reaction, hydroquinone, p-methoxyphenol or the like is used. The proportion of the inhibitor to be added is 0.0001–1 mass% based on the total amount of the component (A-1) or (B-1) and (meth)acrylic acid.

With respect to other reaction conditions, the reaction temperature is 80°–130° C., and the reaction time is 5–7 hours.

As needed, the formed component (A) or (B) may be purified by vacuum distillation or washing with an aqueous alkali solution.

In the above reaction, the component (A) and the component (B) may be separately obtained by individually esterifying the component (A-1) and the component (B-1), while the component (A) and the component (B) may also be obtained in the form of a mixture thereof by preparing a mixture of the component (A-1) and the component (B-1) and esterifying this mixture.

In the present invention, a monomer composition containing either or both of the above-mentioned components (A) and (B) may be used as essential component. However, it is preferable to use a monomer composition containing both component (A) and component (B). In this case, it is preferable to use a monomer composition containing the component (A) and the component (B) in a mass ratio of 97:3 to 20:80, preferably 97:3 to 30:70, more preferably 95:5 to 40:60, most preferably 90:10 to 60:40.

If the proportion of the component (A) is lower than 20 mass% based on the total amount of the component (A) and the component (B), the resulting crosslinked polymer is too high in density of crosslinking and hence tends to become brittle, and high flexibility which is a preferred feature of a resin having an aliphatic carbon chain great in number of carbon atoms may be lost in some cases. It is hence not preferable to use the component (A) in such a low proportion.

On the other hand, from a viewpoint that the component (B) effectively acts on improvements in the heat resistance and transparency of the resulting crosslinked polymer, it is preferred that the mass ratio of the component (A) to the component (B) be within a range of from 97:3 to 30:70.

In the present invention, may be used a monomer composition containing, in addition to the essential component of the component (A) and/or the component (B), a component (C) composed of a monomer copolymerizable with the at least one of components (A) and (B) as actually used, whereby various properties may be imparted to the resulting polymer. In such a case, it is preferable that the proportion of the component (C) is 50 mass% or lower based on the total amount of the components (A), (B) and (C).

As the component (C), there may be used various monomers having at least one acrylic, methacrylic or vinyl group, or the like.

Specific examples of monomers having at least one acrylic or methacrylic group include (meth)acrylates having an aliphatic alkyl group, such as methyl (meth)acrylate, ethyl (meth)acrylate, butyl (meth)acrylate, isobutyl (meth) acrylate, t-butyl (meth)acrylate and n-hexyl (meth)acrylate; (meth)acrylates having an aromatic or alicyclic group, such as phenyl (meth)acrylate, cyclohexyl (meth)acrylate, naphthyl (meth)acrylate and 1,2,3-tribromo-phenyl (meth) acrylate; and polyfunctional (meth)acrylates such as ethylene glycol di(meth)acrylate, polyethylene glycol poly(meth) acrylate, propylene glycol di(meth)acrylate, butylene glycol di(meth)acrylate, neopentyl glycol di(meth) acrylate, 1,6-hexanediol di(meth)acrylate, 1,9-nonanediol di(meth) acrylate, trimethylolpropane tri(meth)acrylate, tetramethylolmethane tri(meth)acrylate, tetramethylol-methane tetra (meth)acrylate, 2,2-bis {4-(meth)acryloxy-phenyl} propane, 2,2-bis {4-(meth)acryloxy-ethoxyphenyl} propane and 2,2-bis {4-(meth)acryloxy-polyethoxyphenyl} propane. In the above mentioning, the term "(meth)" is used in such a manner that the term "(meth)acrylate" means an "acrylate" or a "methacrylate".

The monomer having at least one vinyl group may preferably have an aromatic ring because a polymer having a high refractive index can be provided.

Specific examples of such a monomer include aromatic vinyl compounds such as styrene, α-methylstyrene, divinylbenzene, 4-chlorostyrene, chloromethylstyrene, 4-hydroxymethyl-styrene, ethylstyrene, o-methylstyrene and 4-methoxy-styrene.

The above-mentioned monomers having at least one acrylic, methacrylic or vinyl group may be used either singly or in any combination thereof.

The component (C) usable in the present invention is not limited to the above-listed monomers. It is however preferable to select the component (C) by which the resulting crosslinked polymer has a specific gravity of 0.90–1.20, a refractive index of 1.45–1.60 and a penetration depth of 0.1 mm or lower as measured at 100° C. under a load of 5 kg.

In the present invention, the monomer composition may also contain an antistatic agent, colorant, filler, ultraviolet absorbent, heat stabilizer, antioxidant and other auxiliary materials as necessary for the expected application of the intended plastic lens.

The monomer composition as described above is polymerized or copolymerized, thereby obtaining the crosslinked polymer from which the plastic lens according to the present invention is to be formed. As a polymerization process, there may be employed a process according to radical polymerization, ionic polymerization, photo-polymerization or the like. It is preferable to use a conventional radical polymerization initiator or photopolymerization initiator. For example, a radical polymerization initiator by which a polymerization reaction is caused to start at a temperature of 30°–120° C. may preferably be used in the process according to the radical polymerization. In the process according to the photo-polymerization, a polymerization reaction may be conducted at room temperature or so, and a high pressure mercury lamp or low pressure mercury lamp may be used as a light source.

In the present invention, both components (A) and (B) are polyfunctional monomers. Therefore, a product obtained by the polymerization thereof is a crosslinked polymer. It is hence difficult to use this crosslinked polymer as a molding or forming material for a molding or forming process which is accompanied by dissolution or melting of the polymer. Accordingly, it is preferable to make good use of a cast polymerization process by which the form of the intended plastic lens can be directly given.

The cast polymerization process is a well known technique and can be applied to the present invention as it is. A casting mold, frame or the like in the form of a plate, lens, cylinder, polygonal pillar, cone, sphere or the like, which has been designed according to the intended end and application of the resulting polymer, may be used as a vessel for the cast polymerization. The material thereof can be optionally selected from inorganic glass, plastics, metals, etc. as necessary for the end intended. The polymerization reaction can be practically performed by charging the monomer composition containing a polymerization initiator into the vessel for cast polymerization and then heating the composition. It is also possible to conduct the polymerization reaction by reacting the monomer component or components to a certain degree in advance in another reaction vessel and then pouring the resultant prepolymer or syrup into the vessel for the cast polymerization to complete polymerization. The employed monomer component or components and polymerization initiator may be mixed either all together or by stages.

The crosslinked polymer, from which the plastic lens according to the present invention is to be formed, contains, as essential monomer component or components, the component (A) composed of the ester obtained from the specific diol and (meth)acrylic acid and/or the component (B) composed of the ester obtained from the specific triol and (meth)acrylic acid, and is hence provided as a polymer having a high density of crosslinking and a specific gravity as low as 1.15 or lower.

The plastic lens according to the present invention has a feature that the crosslinked polymer, from which the lens is formed, is obtained from the specific monomer component or components as described above. Accordingly, any means conventionally utilized can be applied to obtain an actual plastic lens from the crosslinked polymer as obtained. More specifically, it is possible to make good use, in addition to the means in which a plastic lens having a particular form is directly obtained by the cast polymerization process as described above, of a means in which a plastic lens in a form intended is skived or shaved from the crosslinked polymer material in the form of a plate or block, or the like. The plastic lens thus obtained can be further subjected to a surface-polishing treatment, an antistatic treatment and other post treatments as needed, whereby a plastic lens having desired performance can be obtained. Further, in order to increase the surface hardness of the plastic lens, it is also possible to coat the surface of the lens with a suitable inorganic material or apply an organic coating material to the surface by dipping or the like.

BEST MODE FOR CARRYING OUT THE INVENTION

The present invention will hereinafter be described by the following examples. However, this invention is not limited to and by these examples. Incidentally, charged amounts upon polymerization in the following examples mean amounts of pure substances unless expressly noted.

The various performance characteristics of the plastic lens obtained in each example were evaluated in the following manner:

(1) Transparency: evaluated by measuring the transmittance of visible rays in accordance with JIS K 7105;
(2) Refractive index, Abbe's number: evaluated by measuring a refractive index and Abbe's number at 20° C. by an Abbe's refractometer;
(3) Specific gravity: measured in accordance with ASTM D 792;
(4) Surface hardness: evaluated by measuring a pencil hardness in accordance with JIS K 5400; and
(5) Heat resistance: evaluated by measuring a penetration depth at 100° C. in accordance with JIS K 7206.

<EXAMPLE 1>

[Preparation of components (A-2) and (B-2)]

One thousand grams of a mixture of higher unsaturated fatty acid esters, which contained 75 mass% of methyl oleate (the total number of carbon atoms in oleic acid: 18), 15 mass% of methyl linoleate (the total number of carbon atoms in linolic acid: 18) and 9 mass% of methyl stearate, were reacted for 5 hours at 230° C. in the presence of 70 g of montmorillonite type activated clay in a nitrogen atmosphere in a 2-liter autoclave. After the catalyst was removed by filtration from the liquid reaction mixture, the reaction mixture was then subjected to molecular distillation to remove a monomer fraction distilled out in a temperature range of 200°–220° C. under a pressure of 0.3–0.5 mmHg, and about 450 g of the dimethyl esters of dimer acids as a component (A-2) and about 150 g of the trimethyl esters of trimer acids as a component (B-2) were recovered. These dimer acid dimethyl esters and trimer acid trimethyl esters were mixed in amounts of 200 g and 50 g, respectively, to prepare a liquid mixture containing both components in a mixing ratio of 80:20.

[Preparation of components (A-1) and (B-1)]

After purging the interior of a reactor equipped with a stirrer, condenser tube, thermometer, dropping funnel and nitrogen gas inlet tube with nitrogen gas, 32 g of lithium aluminum hydride were charged into the reactor. While gradually adding 1200 ml of diethyl ether into the reactor through the dropping funnel at room temperature in a nitrogen gas atmosphere, the contents were stirred, thereby obtaining a dispersion of lithium aluminum hydride. A liquid obtained by diluting 250 g of the above-prepared liquid mixture of the components (A-2) and (B-2) with 350 ml of diethyl ether was added dropwise to this dispersion over about 2 hours, thereby conducting a reaction. The liquid within the reactor was kept at about 30° C. all the while.

After completion of the drop addition, the liquid reaction mixture was left over for 30 minutes, and 65 g of water were then gradually added dropwise through the dropping funnel. The resultant liquid reaction mixture was slowly poured into a beaker containing 350 g of ice. Then, 250 g of 10 mass% aqueous solution of sulfuric acid were added, and a proper amount of diethyl ether was further added to take an ether layer or phase out of the beaker.

The ether layer thus recovered was then washed with water until waste liquid became neutral. The solvent in the ether layer thus washed was distilled off under reduced pressure, thereby obtaining 210 g of a liquid mixture of a component (A-1) and a component (B-1). This liquid mixture was a liquid which was somewhat yellowish, transparent and viscous.

[Preparation of components (A) and (B)]

A reactor equipped with a stirrer, nitrogen gas inlet tube, thermometer, condenser tube and water-measuring tube was charged with 210 g of the liquid mixture of the component (A-1) and the component (B-1), which had been prepared above, 74 g of methacrylic acid, 0.15 g of p-methoxyphenol, 14.2 g of p-toluenesulfonic acid and 120 g of cyclohexane. The contents were heated to about 90° C. while introducing a small amount of air therein and stirring them. While removing formed water outside the system of reaction through the water-measuring tube in a state kept at this temperature, an esterification reaction was conducted for about 6 hours until the total amount of the formed water amounted to 14.0 g.

After the resulting reaction product was then cooled, it was dissolved in 180 g of diethyl ether. The resultant solution was neutralized with 35 g of 10 mass% aqueous solution of sodium hydroxide to separate and remove a water layer. After the remaining ether layer was then washed with water until waste liquid became neutral, 0.15 g of p-methoxy-phenol was added and the solvent was removed by vacuum distillation, thereby obtaining 237 g of a mixture of methacrylic esters, in which a component (A) and a component (B) were mixed. This methacrylate mixture was a somewhat yellowish, transparent liquid.

By the analysis of the methacrylate mixture by liquid chromatography, it was confirmed that a mass ratio of the component (A) to the component (B) was 80:20.

[Cast polymerization]

Two parts by mass of lauroyl peroxide were added to 237 parts by mass of the methacrylate mixture obtained above, thereby preparing a monomer composition.

This monomer composition was cast into a glass-made mold for a lens and successively heated at different temperatures, i.e., 50° C. for 10 hours, 60° C. for 8 hours, 80° C. for 3 hours and 100° C. for 2 hours to complete polymerization, thereby producing a colorless, transparent lens of −2.00 diopter.

This lens had a transmittance of visible rays of 92%, a refractive index of 1.497, an Abbe's number of 56 and a specific gravity as extremely low as 0.951. Besides, this lens was absolutely insoluble in acetone and benzene and hence very high in resistance to organic solvents. Further, the lens had a surface hardness of 2H and a penetration depth of −0.05 mm at 100° C., and was thus excellent in heat resistance.

This lens was immersed for 5 minute at 90° C. in a 0.15 mass% aqueous solution of dyestuff "Sumikalon Blue E FBL" (product of Sumitomo Chemical Co., Ltd.). As a result, the resin molding was dyed in bright blue. The transmittance of visible rays as to this resin molding dyed was measured and found to be 48%.

<EXAMPLE 2>

Polymerization was conducted in the same manner as in Example 1 except that a monomer composition was prepared by mixing 80 parts by mass of the methacrylate mixture containing the component (A) and the component (B) in a mass ratio of 80:20 with 20 parts by mass of 1,9-nonanediol dimethacrylate and 1 part by mass of lauroyl peroxide, thereby producing a colorless, transparent lens of +2.25 diopter.

This lens had a transmittance of visible rays of 91%, a refractive index of 1.523, an Abbe's number of 48 and a specific gravity as extremely low as 0.995. Besides, this lens was absolutely insoluble in acetone and benzene and hence very high in resistance to organic solvents. Further, the lens had a surface hardness of 3H and a penetration depth of 0.02 mm at 100° C., and was hence excellent in both items.

A surface of this lens was coated with a silicone type hard coating material conventionally used. As a result, the adhesion of a hard coating layer formed was excellent.

<EXAMPLE 3>

Polymerization was conducted in the same manner as in Example 1 except that a monomer composition was prepared by mixing 80 parts by mass of the methacrylate mixture containing the component (A) and the component (B) in a mass ratio of 80:20 with 20 parts by mass of tert-butyl methacrylate and 1 part by mass of lauroyl peroxide, thereby producing a colorless, transparent lens of +2.25 diopter.

This lens had a transmittance of visible rays of 90.6%, a refractive index of 1.492, an Abbe's number of 50 and a specific gravity as extremely low as 0.988. Besides, this lens was absolutely insoluble in acetone and benzene and hence very high in resistance to organic solvents. Further, the lens had a surface hardness of 3H and a penetration depth of −0.03 mm at 100° C., and was hence excellent in both items.

A surface of this lens was coated with a silicone type hard coating material conventionally used. As a result, the adhesion of a hard coating layer formed was excellent.

<EXAMPLE 4>

Polymerization was conducted in the same manner as in Example 1 except that a monomer composition was prepared by preparing the methacrylic esters as the component (A) using only the dimethyl esters of the dimer acids in place of the liquid mixture containing the dimethyl esters of the dimer acids and the trimethyl esters of the trimer acids in a proportion of 80:20, and mixing 90 parts by mass of this methacrylic esters with 10 parts by mass of α-methylstyrene and 1 part by mass of lauroyl peroxide, thereby producing a colorless, transparent lens of +1.00 diopter.

This lens had a transmittance of visible rays of 91.4%, a refractive index of 1.510, an Abbe's number of 43 and a specific gravity as extremely low as 0.987. Besides, this lens was absolutely insoluble in acetone and benzene and hence very high in resistance to organic solvents. Further, the lens had a surface hardness of 2H and a penetration depth of −0.04 mm at 100° C., and was hence excellent in both items.

<EXAMPLE 5>

Polymerization was conducted in the same manner as in Example 1 except that a monomer composition was prepared by preparing a methacrylate mixture containing the component (A) and the component (B) in a proportion of 50:50 using a liquid mixture containing the dimethyl esters of the dimer acids and the trimethyl esters of the trimer acids in a proportion of 50:50 in place of the mixture containing the dimethyl esters of the dimer acids and the trimethyl esters of the trimer acids in a proportion of 80:20, and mixing 80 parts by mass of this methacrylate mixture with 10 parts by mass of tert-butyl methacrylate, 10 parts by mass of 96% divinylbenzene and 0.8 part by mass of azobisisobutyronitrile, thereby producing a colorless, transparent lens of +3.00 diopter.

This lens had a transmittance of visible rays of 91%, a refractive index of 1.514, an Abbe's number of 42 and a specific gravity as extremely low as 1.022. Besides, this lens was absolutely insoluble in acetone and benzene and hence very high in resistance to organic solvents. Further, the lens had a surface hardness of 3H and a penetration depth of 0.02 mm at 100° C., and was hence excellent in both items.

We claim:

1. A plastic lens formed of a crosslinked polymer obtained by cast copolymerizing a monomer composition comprising as essential components the following component (A) and the following component (B), and optionally a component (C) composed of at least one monomer copolymerizable with the essential component comprising the component (A) and the component (B):

Component (A):

an ester obtained from (1)(a) a diol which is obtained by reducing a dimer of an unsaturated fatty acid having 16–18 carbon atoms and/or (b) a diol which is obtained by reducing a dimer of a lower alcohol ester of an unsaturated fatty acid having 16–18 carbon atoms, and (2) acrylic acid or methacrylic acid; and Component (B):

an ester obtained from (1)(a) a triol which is obtained by reducing a trimer of an unsaturated fatty acid having 16–18 carbon atoms and/or (b) a triol which is obtained by reducing a trimer of a lower alcohol ester of an unsaturated fatty acid having 16–18 carbon atoms, and (2) acrylic acid or methacrylic acid.

2. The plastic lens according to claim 1, wherein the monomer composition contains the component (A) and the component (B) in a mass ratio of from 97:3 to 30:70.

3. The plastic lens according to claim 1, wherein the component (C) is composed of at least one monomer having at least one acrylic, methacrylic or vinyl group, and the monomer composition contains the component (C) in a mass ratio equal to or lower than the total amount of the component (A) and the component (B).

4. The plastic lens according to claim 1, wherein the component (C) is composed of at least one monomer having an aromatic ring and at least one vinyl group, and the monomer composition contains the component (C) in a mass ratio equal to or lower than the total amount of the component (A) and the component (B).

5. A process for producing a plastic lens, which comprises the step of cast copolymerizing a monomer composition comprising as essential components the following component (A) and the following component (B), and optionally a component (C) composed of at least one monomer copolymerizable with the essential component comprising the component (A) and the component (B):

Component (A):

an ester obtained from (1)(a) a diol which is obtained by reducing a dimer of an unsaturated fatty acid having 16–18 carbon atoms and/or (b) a diol which is obtained by reducing a dimer of a lower alcohol ester of an unsaturated fatty acid having 16–18 carbon a toms, and (2) acrylic acid or methacrylic acid; and Component (B):

an ester obtained from (1)(a) a triol which is obtained by reducing a trimer of an unsaturated fatty acid having 16–18 carbon atoms and/or (b) a triol which is obtained by reducing a trimer of a lower alcohol ester of an unsaturated fatty acid having 16–18 carbon atoms, and (2) acrylic acid or methacrylic acid.

6. The process for producing a plastic lens according to claim 5, which comprises using, as the monomer composition, a monomer composition containing the component (A) and the component (B) in a mass ratio of from 97:3 to 30:70.

7. The process for producing a plastic lens according to claim 5, which comprises using, as the monomer composition, a monomer composition wherein the component (C) is composed of at least one monomer having a t least one acrylic, methacrylic or vinyl group, and is contained in a mass ratio equal to or lower than the total amount of the component (A) and the component (B).

8. The process for producing a plastic lens according to claim 5, which comprises using, as the monomer composition, a monomer composition wherein the component (C) is composed of at least one monomer having an aromatic ring and at least one vinyl group, and is contained in a mass ratio equal to or lower than the total amount of the component (A) and the component (B).

9. The plastic lens according to claim 2, wherein the component (C) is composed of at least one monomer having at least one acrylic, methacrylic or vinyl group, and the monomer composition contains the component (C) in a mass ratio equal to or lower than the total amount of the component (A) and the component (B).

10. The plastic lens according to claim 2, wherein the component (C) is composed of at least one monomer having an aromatic ring and at least one vinyl group, and the monomer composition contains the component (C) in a mass ratio equal to or lower than the total amount of the component (A) and the component (B).

11. The process for producing a plastic lens according to claim 6, which comprises using, as the monomer composition, a monomer composition wherein the component (C) is composed of at least one monomer having at least one acrylic, methacrylic or vinyl group, and is contained in a mass ratio equal to or lower than the total amount of the component (A) and the component (B).

12. The process for producing a plastic lens according to claim 6, which comprises using, as the monomer composition, a monomer composition wherein the component (C) is composed of at least one monomer having at least one monomer having an aromatic ring and at least one vinyl group, and is contained in a mass ratio equal to or lower than the total amount of the component (A) and the component (B).

* * * * *